US010725196B2

(12) United States Patent
Pan et al.

(10) Patent No.: US 10,725,196 B2
(45) Date of Patent: Jul. 28, 2020

(54) BI-MODE HIGH FREQUENCY DIELECTRIC TOOL

(71) Applicant: Halliburton Energy Services, Inc., Houston, TX (US)

(72) Inventors: Li Pan, Singapore (SG); Chao-Fu Wang, Singapore (SG); Rencheng Song, Singapore (SG); Jin Ma, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/309,659

(22) PCT Filed: Apr. 29, 2015

(86) PCT No.: PCT/US2015/028283
§ 371 (c)(1),
(2) Date: Nov. 8, 2016

(87) PCT Pub. No.: WO2016/175796
PCT Pub. Date: Nov. 3, 2016

(65) Prior Publication Data
US 2017/0261634 A1    Sep. 14, 2017

(51) Int. Cl.
*G01V 3/30* (2006.01)
*H01Q 13/02* (2006.01)

(52) U.S. Cl.
CPC ............... *G01V 3/30* (2013.01); *H01Q 13/02* (2013.01)

(58) Field of Classification Search
CPC ... G01V 3/18; G01V 3/20; G01V 3/22; G01V 3/24; G01V 3/26; G01V 3/30; G01V 3/36;
(Continued)

(56) References Cited

U.S. PATENT DOCUMENTS 2,818,549 A * 12/1957 Adcock ............... G01S 13/4409
333/113
3,654,556 A *  4/1972 Wen ......................... H01P 5/16
333/117
(Continued)

FOREIGN PATENT DOCUMENTS

EP          0993064 B1    12/2002
WO     2008/031505 A1     3/2008

OTHER PUBLICATIONS

Marc J. Franco, A High-Performance Dual-Mode Feed Horn for Parabolic Reflectors with a Stepped-Septum Polarizer in a Circular Waveguide, Antenna Designer's Notebook, IEEE Antennas and Propagation Magazine, vol. 53, No. 3, Jun. 2011, pp. 142-145.*

(Continued)

*Primary Examiner* — David M Schindler
(74) *Attorney, Agent, or Firm* — John W. Wustenberg; Baker Botts L.L.P.

(57) ABSTRACT

A transmitter/receiver for use in a dielectric logging tool. The transmitter/receiver generally includes a housing, a septum, a first antenna, and a second antenna. When operated as a transmitter, a first and second electromagnetic signal are emitted by the first and second antenna, respectively. The housing and septum are shaped to combine the first and second electromagnetic signals into a combined signal having varying orientations depending on the phase difference between the first and second electromagnetic signals. When operated as a receiver, an incoming electromagnetic signal is divided into a first and second component signal. The first and second component signals are directed to the first and second antennas, respectively, where they are converted into first and second electrical signals. The first and second electrical signals can then be combined, by adding or subtracting the signals for example, to produce a (Continued)

resultant electrical signal corresponding to incoming electromagnetic signals having different orientations.

22 Claims, 6 Drawing Sheets

(58) Field of Classification Search
CPC ...... G01V 3/38; H01Q 13/02; H01Q 13/0025; H01Q 13/0233; H01Q 13/0241; H01Q 13/025; H01Q 13/18; H01Q 13/0275; H01Q 25/02; H01Q 25/04; H01Q 5/55; H01P 1/171; H01P 1/172; H01P 1/173; H01P 1/174; H01P 5/12; H01P 5/16; H01P 5/18
See application file for complete search history.

(56) References Cited

U.S. PATENT DOCUMENTS

| | | | |
|---|---|---|---|
| 4,150,382 A | 4/1979 | King | |
| 4,704,581 A | 11/1987 | Clark | |
| 5,210,495 A | 5/1993 | Hapashy et al. | |
| 5,243,290 A | 9/1993 | Safinya et al. | |
| 5,345,179 A | 9/1994 | Habashy et al. | |
| 5,406,206 A * | 4/1995 | Safinya | G01V 3/30 324/335 |
| 5,434,507 A | 7/1995 | Beren et al. | |
| 6,734,675 B2 | 5/2004 | Fanini et al. | |
| 6,957,708 B2 | 10/2005 | Chemali et al. | |
| 7,284,605 B2 | 10/2007 | Clark et al. | |
| 7,348,781 B2 | 3/2008 | Tabanou et al. | |
| 7,376,514 B2 | 5/2008 | Habashy et al. | |
| 7,660,671 B2 | 2/2010 | Taherian et al. | |
| 7,948,238 B2 | 5/2011 | Bittar | |
| 8,237,444 B2 | 8/2012 | Simon | |
| 8,710,846 B2 | 4/2014 | Simon et al. | |
| 2005/0231436 A1* | 10/2005 | McLean | H01Q 13/0275 343/786 |
| 2006/0145700 A1* | 7/2006 | Tabanou | G01V 3/30 324/347 |
| 2009/0150076 A1 | 6/2009 | Taherian et al. | |
| 2010/0176813 A1 | 7/2010 | Simon | |
| 2011/0221443 A1* | 9/2011 | Bittar | G01V 3/30 324/339 |
| 2011/0251794 A1* | 10/2011 | Bittar | G01V 3/30 702/11 |
| 2013/0009646 A1 | 1/2013 | Simon et al. | |
| 2013/0176030 A1 | 7/2013 | Simon | |

OTHER PUBLICATIONS

Kumar et al., Coaxial FeedPyramidal Horn Antenna with High Efficiency, IETE Journal of Research, May 2017, 10 pages. (Year: 2017).*

Eskelinen et al., DFM(A)—Aspects for a Horn Antenna Design, Research report 55, 2004, 34 pages. (Year: 2004).*

Hassani et al., Quad ridged horn antenna for UWB applications, Progress in Electromagnetics Research, Jan. 2008, 17 pages. (Year: 2008).*

Crain's Petrophysical Handbook (Online), "Electromagnetic Propagation Log Basics", found at https://www.spec2000.net/07-eptlog.htm.

Chen et al., "A Wide-Band Square-Waveguide Array Polarizer", IEEE Transactions on Antennas and Propagation, vol. 21, pp. 389-391, May 1973.

International Search Report and Written Opinion issued in related PCT Application No. PCT/US2015/028283 dated Jan. 18, 2016, 14 pages.

International Preliminary Report on Patentability issued in related PCT Application No. PCT/US2015/028283 dated Nov. 9, 2017, 11 pages.

* cited by examiner

BI-MODE HIGH FREQUENCY DIELECTRIC TOOL

CROSS-REFERENCE TO RELATED APPLICATION

The present application is a U.S. National Stage Application of International Application No. PCT/US2015/028283 filed Apr. 29, 2015, which is incorporated herein by reference in its entirety for all purposes.

BACKGROUND

Modern oil field operations demand a great quantity of information relating to the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including, but not limited to, wireline or slickline logging, "logging while drilling" (LWD), drillpipe-conveyed logging, coiled tubing-conveyed logging, and tractor-conveyed logging.

One example of a logging tool suitable for use in any of these logging configurations is a dielectric tool. Generally, a dielectric tool includes at least one transmitter and at least one receiver. During logging, the transmitter and receiver abut the adjacent formation and an electromagnetic signal is generated at the transmitter. The electromagnetic signal propagates through the formation such that a portion of the electromagnetic signal reaches the receiver. As the electromagnetic signal propagates through the formation, characteristics of the electromagnetic signal, such as amplitude and phase, change due to the composition and structure of the formation. By measuring the propagation time and changes to the electromagnetic signal's characteristics, an operator can determine properties of the formation through calculation or comparison to previously collected data including, but not limited to, resistivity, permittivity, dielectric constant, water-filled porosity, and water saturation.

The electromagnetic signal is generated by an antenna associated with the transmitter by providing an electrical signal to the antenna. The orientation of the electromagnetic signal produced by the antenna is generally fixed based on the orientation of the antenna and shape of the transmitter housing.

Because formation composition and properties may vary in multiple directions, it is often desirable to collect dielectric logging data using electromagnetic signals in multiple orientations. For example, transmitters having an antenna arranged perpendicular to the dielectric tool axis are sometimes described as operating in "broadside" mode. Broadside mode generally exhibits higher coupling gain and is therefore preferred in lossy logging environments with low resistivity. As another example, transmitters having an antenna arranged parallel to the dielectric tool axis are sometimes described as operating in "endfire" mode and produce an electromagnetic signal perpendicular to that produced in broadside mode. In endfire mode, a dielectric tool determines formation properties primarily in a plane orthogonal to the tool axis. Endfire mode provides greater depth of investigation and is less affected by standoff (i.e., gaps between the transmitter and receiver and the surface of the wellbore caused by a layer of drilling mud or general unevenness of the wellbore surface). Accordingly, a dielectric tool capable of operating in multiple modes is desirable.

BRIEF DESCRIPTION OF THE DRAWINGS

A more complete understanding of the present embodiments and their advantages may be acquired by referring to the following description taken in conjunction with the accompanying drawings, in which like reference numbers indicate like features.

FIG. 5A is an isometric view, FIG. 5B is a front view, and FIG. 5C is a cross-sectional view;

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to dielectric logging tools. More specifically, the present disclosure relates to a transmitter/receiver capable of multi-modal operation for use in a dielectric logging tool.

Illustrative embodiments of the present invention are described in detail herein. In the interest of clarity, not all features of an actual implementation may be described in this specification. It will of course be appreciated that in the development of any such actual embodiment, numerous implementation specific decisions must be made to achieve the specific implementation goals, which will vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of this disclosure, the following examples of certain embodiments are given. In no way should the following examples be read to limit, or define, the scope of the claims.

Figure 1:
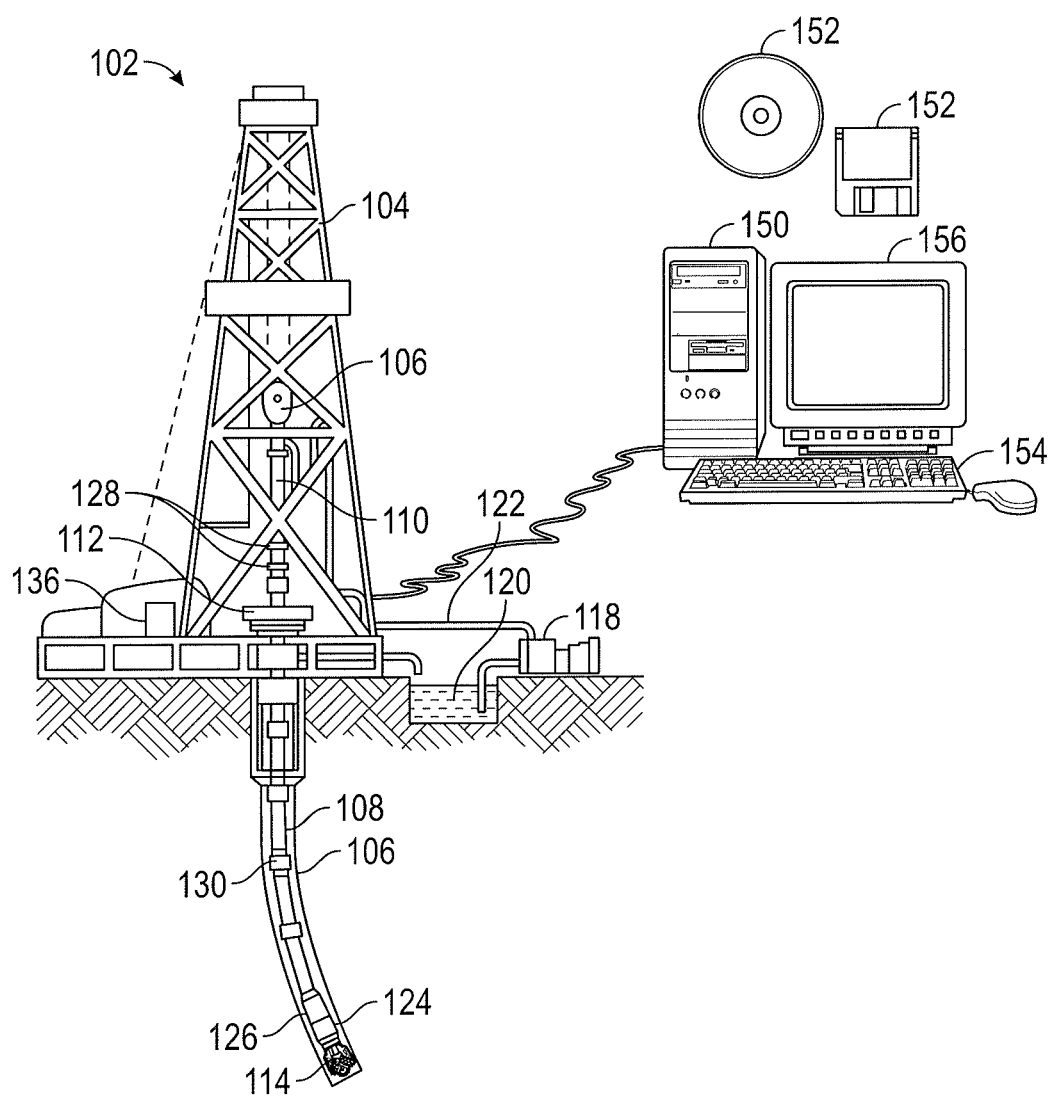
FIG. 1 depicts an illustrative logging while drilling (LWD) environment.

The disclosed sensor, tools, and methods are best understood in the context of the larger systems in which they operate. Accordingly, FIG. 1 shows an illustrative drilling environment. A drilling platform 102 supports a derrick 104 having a traveling block 106 for raising and lowering a drill string 108. A top drive 110 supports and rotates the drill string 108 as it is lowered through the wellhead 112. A drill bit 114 is driven by a downhole motor and/or rotation of the drill string 108. As bit 114 rotates, it creates a borehole 116 that passes through various formations. A pump 118 circulates drilling fluid 120 through a feed pipe 122, through the interior of the drill string 108 to drill bit 114. The fluid exits through orifices in the drill bit 114 and flows upward through the annulus around the drill string 108 to transport drill cuttings to the surface, where the fluid is filtered and recirculated.

The drill bit 114 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used.

A LWD tool 124 may be integrated into the bottom-hole assembly near the bit 114. As the bit extends the borehole through the formations, the LWD tool 124 rotates and collects azimuthally-dependent reflection measurements that a downhole controller associates with tool position and orientation measurements. The measurements can be stored in internal memory and/or communicated to the surface. A telemetry sub 126 may be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a data acquisition module 136 receives the uplink signal from the telemetry sub 126. Module 136 optionally provides some preliminary processing and digitizes the signal. A data processing system 150 (shown in FIG. 1 as a computer) receives a digital telemetry signal, demodulates the signal, and displays the tool data or well logs to a user. Software (represented in FIG. 1 as information storage media 152) governs the operation of system 150. A user interacts with system 150 and its software 152 via one or more input devices 154 and one or more output devices 156.

Figure 2:
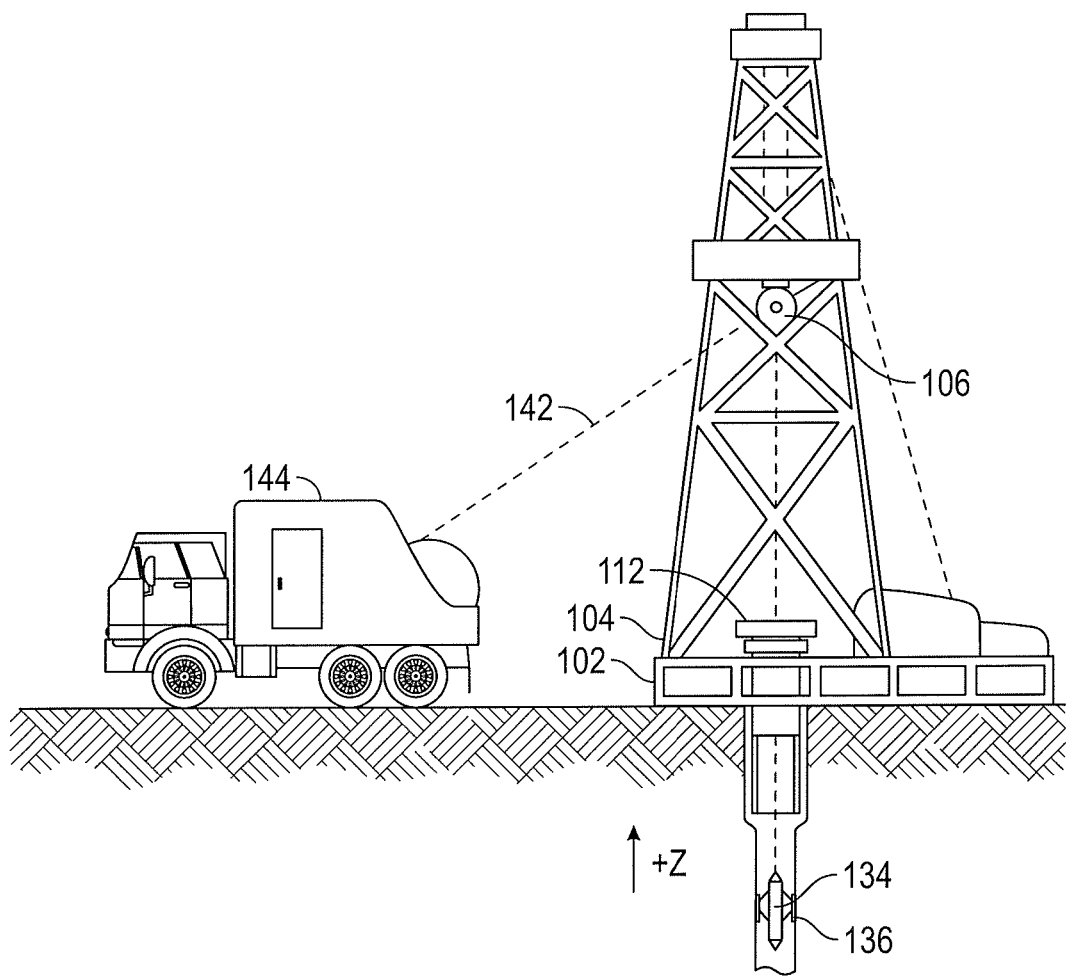
FIG. 2 depicts an illustrative wireline logging environment.

In wireline-based logging operations, the drill string 108 may be removed from the borehole at various times during the drilling process, as indicated in FIG. 2. Once the drill string has been removed, logging operations can be conducted using a wireline logging tool 134, i.e., a sensing instrument sonde suspended by a cable 142, which may have conductors for transporting power to the tool and telemetry from the tool to the surface. A dielectric logging portion of the logging tool 134 may include movable sensing pads 136 that are made to abut the borehole wall as the logging tool 134 is positioned within the wellbore. A logging facility 144 collects measurements from the logging tool 134, and includes computing facilities for processing and storing the measurements gathered by the logging tool 134.

Figure 3:
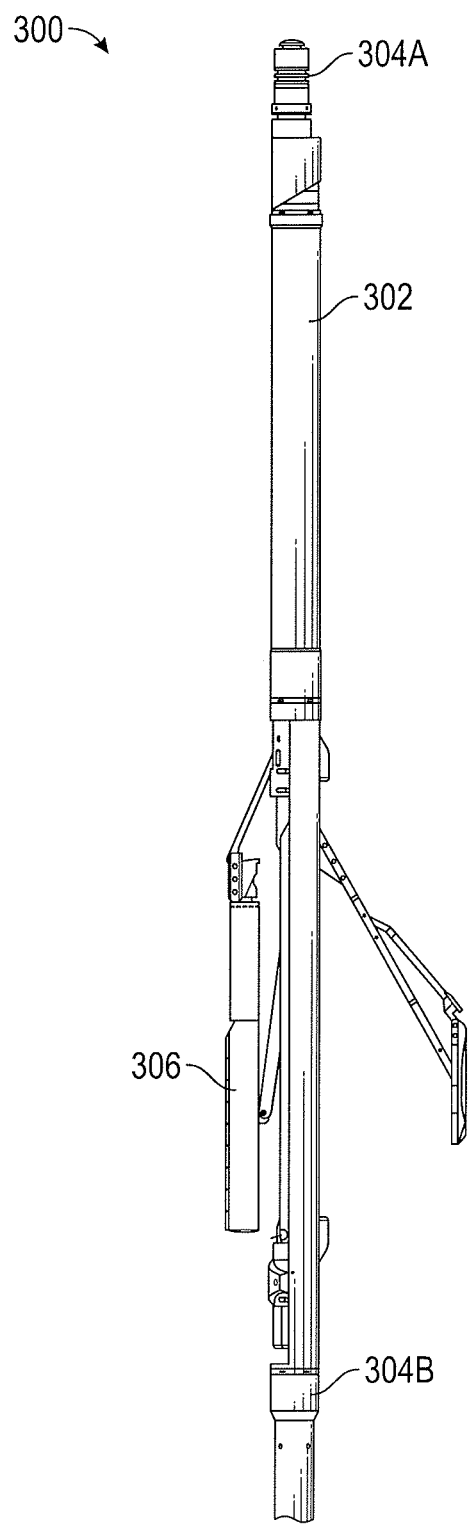
FIG. 3 depicts a dielectric tool suitable for conveyance by drill pipe or coiled tubing.

FIG. 3 depicts an alternative dielectric tool 300 suitable for conveyance along the wellbore by drillpipe or coiled-tubing. The dielectric tool 300 generally comprises a rigid housing 302 having threaded connections 304A, 304B for connection to adjacent sections of drillpipe or coiled tubing. Because of the rigidity of the attached drill string or coiled tubing, the dielectric tool 300 can be conveyed through highly deviated sections of the wellbore.

Similar to the wireline-conveyed dielectric tool, the dielectric tool 300 may include a movable sensing pad 306. As depicted in FIG. 3, the sensing pad 306 is in an extended position. In the extended position, the sensing pad is made to abut the inner surface of the wellbore such that measurements of the surrounding formation may be taken. The sensing pad 306 may be retracted when not in use, allowing for easier conveyance of the dielectric tool within the wellbore and protection or the onboard electronics of the dielectric tool when not in use.

Figure 4:
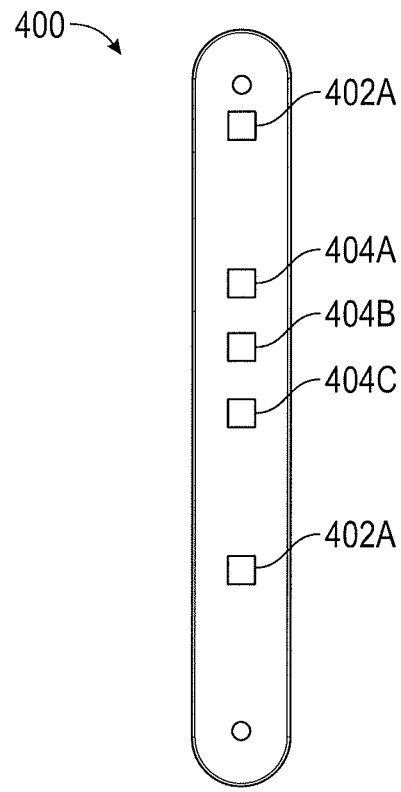
FIG. 4 is a schematic view of a sensing pad for use in a dielectric tool.

FIG. 4 depicts a sensing pad 400 suitable for use in a dielectric tool, such as the dielectric tool 124, 134, or 300. A dielectric tool may function with as few as one transmitter and one receiver, though using multiple transmitters and receivers is generally advantageous. As shown, the sensing pad 400 includes two transmitters 402A, 402B, and three receivers 404A, 404B, 404C. The presence of multiple receivers may offer a significantly extended operating range, additional depths of investigation, increased measurement accuracy, and permit compensation for tool standoff and mudcake effects. Although not depicted, a dielectric tool may also include sensors, such as pressure and temperature sensors, to provide additional compensation for downhole conditions.

During operation, the dielectric tool is positioned within the wellbore and the sensing pad is made to abut the formation. Each of the three receivers 404A, 404B, and 404C provides an attenuation and phase shift measurement in response to the firing of transmitter 402A, providing six independent measurements. Six additional measurements are obtained in response to firing the second transmitter 402B. These six additional measurements can optionally be combined with the first six to provide a set of compensated measurements. The dielectric tool may also include other sensors for measuring downhole conditions such as temperature and pressure for additional compensation.

Transmitters of the dielectric tool, such as transmitters 402A and 402B, can consist of an antenna disposed within a conductive transmitter housing having an aperture. During logging, the aperture is oriented such that it abuts the formation to be logged. The transmitter antenna is connected to a feed circuit that provides a high-frequency electrical signal (for example, in the range of 100 MHz to 10 GHz) to the transmitter antenna, exciting the transmitter antenna and causing the antenna to convert the high-frequency electrical power into a high-frequency electromagnetic signal. As the electromagnetic signal propagates within the housing, the transmitter housing acts as a wave guide, directing the electromagnetic signal towards the aperture and into the adjacent formation.

Similar to transmitters, the dielectric tool receivers can consist of an antenna disposed within a housing having an aperture. The housing is configured to act as a waveguide such that electromagnetic signals that enter the receiver housing through the aperture are directed towards the receiver antenna. The electromagnetic signals are absorbed by the receiver antenna which converts the electromagnetic signal into an electrical signal which may then be measured and analyzed to determine formation properties.

Figure 5A:
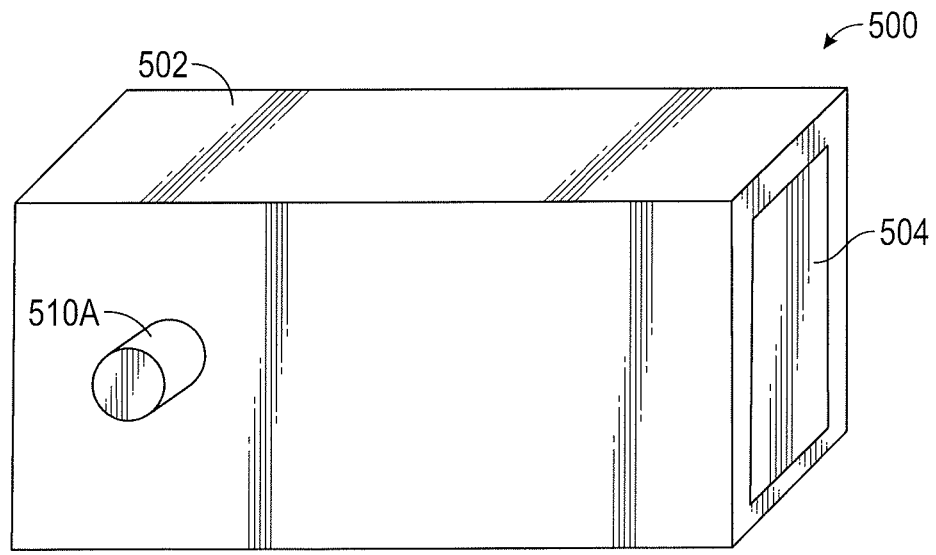
FIGS. 5A-C are various views of a transmitter/receiver in accordance with an embodiment of the present disclosure—specifically.
Figure 5B:
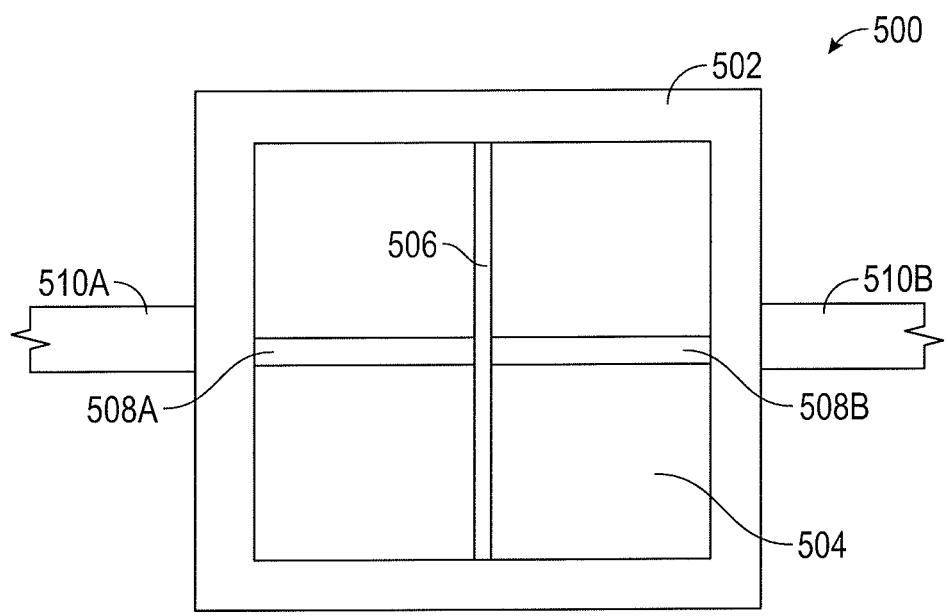
Figure 5C:
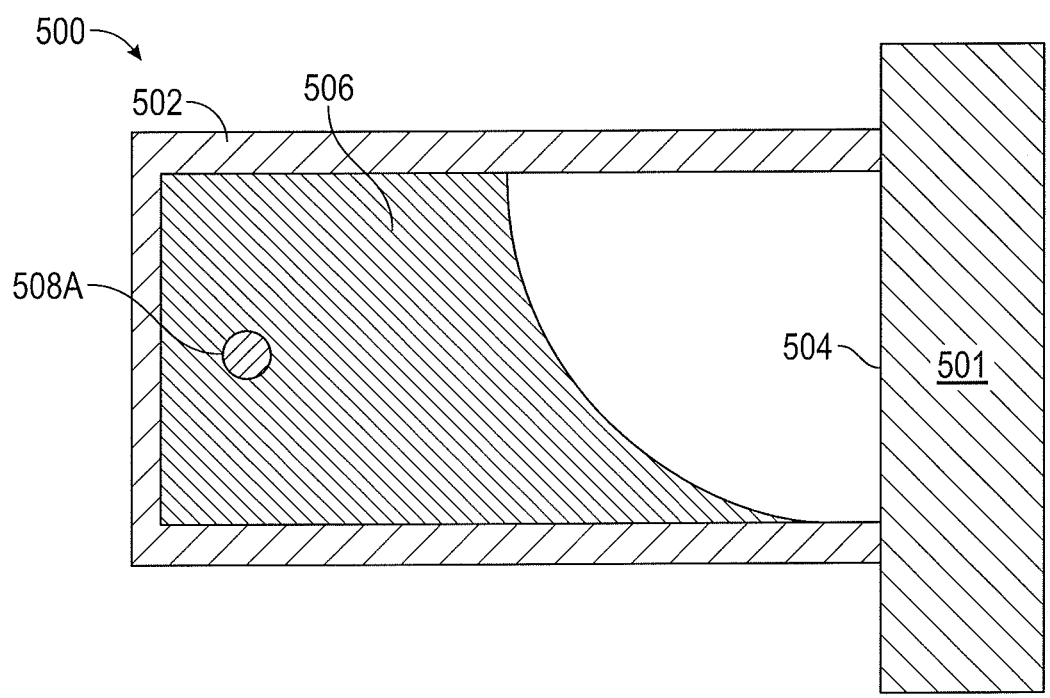

FIGS. 5A, 5B, and 5C depict one embodiment of a transmitter/receiver 500 in accordance with this disclosure. Transmitter/receiver 500 includes a conductive housing 502 having an aperture 504. Disposed within the housing 502 is a conductive septum 506. Extending from opposite sides of the housing 502 to respective sides of the septum 506 are two antennas 508A and 508B. As depicted, antennas 508A and 508B may be collinear. Antennas 508A and 508B may also be of any suitable construction for producing high-frequency electromagnetic signals. For example, as depicted in FIG. 5B, antennas 508A and 508B are cores of coaxial cables 510A and 510B. The cavity defined by the housing 502 and septum 506 may be filled with a dielectric material. Although the present disclosure is not limited to a particular dielectric filler material, materials having a high dielectric constant are generally preferred.

The housing of the transmitter or receiver generally acts as a waveguide, directing electromagnetic signals from or to an antenna. In the case of transmitter/receiver 500, and as visible in FIG. 5C, which depicts the transmitter/receiver positioned against a formation 501, septum 506 divides a first section of the inner cavity of the housing 502 into two parallel waveguides. As the septum 506 extends towards the aperture 504, the septum 502 narrows and eventually terminates within the housing 502 such that the remaining length of the housing 502 between the termination of the septum 506 and the aperture 504 forms a single waveguide.

When the transmitter/receiver 500 is operated as a transmitter, a high-frequency electrical signal is provided to each of antennas 508A and 508B. Antennas 508A and 508B convert the electrical signal into a first and second electromagnetic signal, which propagate along the length of the housing 502. Initially, the electromagnetic signals are separated by the septum 506 and directed by the two parallel waveguides. As the septum 506 narrows, the first and second electromagnetic signals combine such that when the septum 506 terminates, the first and second electromagnetic signals form a combined electromagnetic signal. The combined electromagnetic signal propagates along the remainder of the housing 502 until it reaches the aperture 506 and exits the housing 502.

To facilitate operation in both broadside and endfire modes, the septum 506 and housing 502 are configured such that the transmitter produces electromagnetic signals in orientations corresponding to broadside and endfire modes depending on the excitation of antennas 508A and 508B. To produce an electromagnetic signal corresponding to broadside mode, antennas 508A and 508B are excited in an even mode in which the electrical signals used to excite each of the antennas 508A, 508B are substantially in phase. To produce an electromagnetic signal corresponding to endfire mode, antennas 508A, 508B are excited in an odd mode in which the electrical signals used to excite antenna 508A and the electrical signal used to excite antenna 508B differ in phase.

When the transmitter/receiver 500 is operated as a receiver, an incoming electromagnetic signal enters the housing 502 via the aperture 504 and is guided towards the septum 506. The septum 506 divides the incoming electromagnetic signal into two separate signal components. Each of the signal components then propagates along the remainder of the housing, through one of the waveguides defined by the septum 506 and housing 502, to their respective antenna 508A or 508B. Once received by antennas 508A and 508B, the electromagnetic signals are converted into corresponding electrical signals. If the dielectric tool is operating in broadside mode, the electrical signals received by antennas 508A and 508B are added together to produce a corresponding resultant broadside signal. If, on the other hand, the dielectric tool is operating in endfire mode, the electrical signals received by antennas 508A and 508B are subtracted from each other, the difference between the signals corresponding to a resultant endfire signal.

Figure 6:
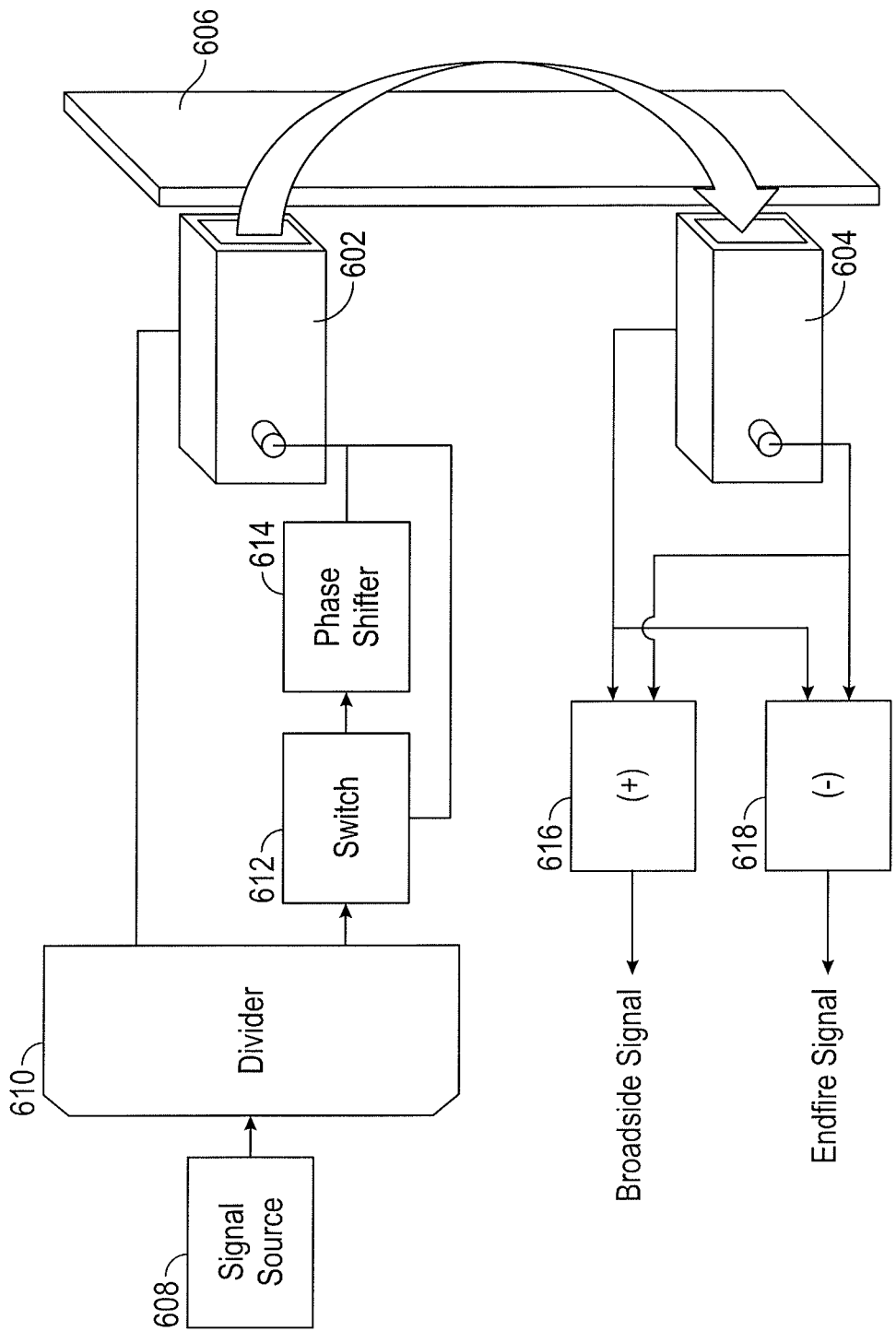
FIG. 6 is a block diagram depicting an embodiment of electronics suitable for operation of a pair of transmitter/receivers in accordance with an embodiment of the present disclosure.

FIG. 6 is a block diagram depicting one embodiment of electronics that may be used in connection with transmitter/receivers in accordance with this disclosure. FIG. 6 depicts a transmitter 602 and a receiver 604. The transmitter 602 and receiver 604 are depicted as abutting a formation 606. As previously discussed, the transmitter 602 includes two antennas. Similarly, the receiver 604 comprises two antennas.

During operation, an electrical signal is produced by a signal source 608 and is passed into a power divider 610. The power divider 610 splits the electrical signal into two separate feeder signals for each of the transmitter antennas. The first feeder signal is sent directly from the power divider 610 to the first transmitter antenna. The second feeder signal, on the other hand, is first redirected by a switch 612. The switch 612 is operable between a first and second position corresponding to broadside and endfire modes, respectively. In the first/broadside position, the switch 612 permits the signal to pass directly to second transmitter antenna. In the second/endfire position, the switch 612 causes the signal to first pass through a phase shifter 614 before reaching the second transmitter antenna. As a result, when switch 612 is positioned to operate the dielectric tool in endfire mode, the first transmitter antenna produces a first electromagnetic signal while the second transmitter antenna produces a second electromagnetic signal that is phase-shifted from the electromagnetic signal produced by the first antenna.

The transmitter 602 combines electromagnetic signals generated by the transmitter antennas into a single electromagnetic signal that is then passed through the formation 606. At least a portion of the combined electromagnetic signal generated by the transmitter 602 reaches the receiver 604. Due to the construction of the receiver 604, the electromagnetic signal is divided between the first and second receiver antennas, producing a first and second response signal, respectively.

The first and second response signals may then be combined and/or compared to produce a final output signal. If the dielectric tool is being operated in broadside mode, the first and the second response signals are added together 616 to produce an output signal corresponding to broadside mode operation. Alternatively, if the dielectric tool is being operated in endfire mode, the difference between the first and second response signals 618 provides an output signal corresponding to endfire mode. In any mode, a timing circuit (not depicted) may also be included to determine the propagation time between the transmitter and receiver. Although not depicted in FIG. 6 additional electronics may be present in the dielectric tool. For example, the tool electronics may include a system clock, a control unit, a multichannel data acquisition unit, and a data processing and storage unit.

Once an output signal has been produced, it may be analyzed to determine formation properties. For example, the phase and amplitude of the output signal may be compared to a reference signal, such as the combined electromagnetic signal or the originally generated electrical signal, to determine changes in phase and amplitude during propagation through the formation. Propagation time, as determined by a timing circuit, may also be included in the analysis. Analysis of the output signal may include any of processing, transmitting, storing, retrieving, and performing calculations on the output signal. Analysis of the output signal may also include analysis of any data derived from or representing the output signal.

Analysis of the output signal may be performed by an operator and/or an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. An information handling system may be a personal computer, a network storage device, or any other suitable device and may vary in size, shape, performance, functionality, and price. The information handling system may include random access memory (RAM), one or more processors or processing resources such as a central processing unit (CPU) or hardware or software control logic, ROM, and/or other types of nonvolatile memory. As used herein, a processor may comprise a microprocessor, a microcontroller, a digital signal processor (DSP), an application specific integrated circuit (ASIC), or any other digital or analog circuitry configured to interpret and/or execute program instructions and/or process data for the associated tool or sensor. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Although numerous characteristics and advantages of embodiments of the present invention have been set forth in the foregoing description and accompanying figures, this description is illustrative only. Changes to details regarding structure and arrangement that are not specifically included in this description may nevertheless be within the full extent indicated by the claims.

What is claimed is:

1. An electromagnetic apparatus for operation as a transmitter or a receiver, comprising:
    a housing defining a cavity, wherein the housing has an aperture at one end thereof;
    a septum disposed within the cavity and extending from a first wall of the housing to a second wall of the housing along at least a portion of the cavity, wherein a height of the septum is measured from the first wall, wherein the height of the septum decreases as it extends along a length of the cavity in a direction of the aperture, and wherein the height decreases continuously along a curved path such that a leading edge of the septum is concave;
    a first antenna disposed within the cavity and extending from the housing to a first side of the septum; and
    a second antenna disposed within the cavity and extending from the housing to a second side of the septum, wherein the first antenna and the second antenna produce an electromagnetic signal or convert a received electromagnetic signal to an electrical signal.

2. The electromagnetic apparatus of claim 1, wherein the septum and housing are shaped to combine a first electromagnetic signal emitted by the first antenna and a second electromagnetic signal emitted by the second antenna into a combined signal, such that
    when the first and the second electromagnetic signals are in phase, the combined signal is in a first orientation, and
    when the first and the second electromagnetic signals are out of phase, the combined signal is in a second orientation;
    wherein the combined signal is the produced electromagnetic signal.

3. The electromagnetic apparatus of claim 1, wherein the septum and housing are shaped to divide an incoming electromagnetic signal entering the housing into first and second component signals and direct the first and second component signals to the first and second antennas, respectively;
    wherein the incoming electromagnetic signal is the received electromagnetic signal.

4. The electromagnetic apparatus of claim 3, wherein the first and second antennas convert the first and second component signals into first and second electrical signals, respectively.

5. The electromagnetic apparatus of claim 1, wherein at least one of the first and the second antenna comprise a core of a coaxial cable, and wherein the cavity is filled with a dielectric filler.

6. The electromagnetic apparatus of claim 1, wherein the septum decreases in height until it terminates within the housing such that a remaining length of the housing between where the septum terminates and the aperture forms a single waveguide.

7. The electromagnetic apparatus of claim 1, wherein the housing has a back end opposite the aperture, wherein the back end is coupled between the first and second walls of the housing, and wherein the septum is connected to both the first and second walls of the housing at the back end of the housing.

8. The electromagnetic apparatus of claim 1, wherein the first antenna is connected to the first side of the septum, and wherein the second antenna is connected to the second side of the septum.

9. The electromagnetic apparatus of claim 1, wherein the housing comprises a rectangular shaped housing having the first wall, the second wall, a third wall, and a fourth wall, wherein the first wall and the second wall are coupled between the third wall and the fourth wall, and wherein the first wall is parallel to the second wall along an entire length of the housing and the third wall and the fourth wall are parallel to each other along the entire length of the housing.

10. The electromagnetic apparatus of claim 1, wherein:
    the first antenna extends from a third wall of the housing towards the first side of the septum;
    the first antenna is coupled to the first side of the septum;
    the second antenna extends from a fourth wall of the housing towards the second side of the septum; and
    the second antenna is coupled to the second side of the septum.

11. The electromagnetic apparatus of claim 10, wherein the first antenna and the second antenna are coupled to the septum such that the first antenna and the second antenna are collinear.

12. A dielectric tool for use in a wellbore, comprising:
    a tool body with a sensing pad disposed thereon;
    at least one transmitter disposed on the sensing pad, wherein the transmitter comprises:
        a transmitter housing defining a transmitter cavity, wherein the transmitter housing has a transmitter aperture at one end thereof;
        a transmitter septum disposed within the transmitter cavity and extending from a first wall of the transmitter housing to a second wall of the transmitter housing along at least a portion of the transmitter cavity, wherein a height of the transmitter septum is measured from the first wall of the transmitter housing, wherein the height of the transmitter septum decreases as it extends along a length of the transmitter cavity in a direction of the transmitter aperture, and wherein the height of the transmitter septum decreases continuously along a curved path such that a leading edge of the transmitter septum is concave;

a first transmitter antenna disposed within the transmitter cavity and extending from the transmitter housing to a first side of the transmitter septum; and a second transmitter antenna disposed within the transmitter cavity and extending from the transmitter housing to a second side of the transmitter septum, wherein the first transmitter antenna and the second transmitter antenna produce an electromagnetic signal; and at least one receiver disposed on the sensing pad, the receiver comprising:

a receiver housing defining a receiver cavity, wherein the receiver housing has a receiver aperture at one end thereof;

a receiver septum disposed within the receiver cavity and extending from a first wall of the receiver housing to a second wall of the receiver housing along at least a portion of the receiver cavity, wherein a height of the receiver septum is measured from the first wall of the receiver housing, wherein the height of the receiver septum decreases as it extends along a length of the receiver cavity in a direction of the receiver aperture, and wherein the height of the receiver septum decreases continuously along a curved path such that a leading edge of the receiver septum is concave;

a first receiver antenna disposed within the receiver cavity and extending from the receiver housing to a first side of the receiver septum; and a second receiver antenna disposed within the receiver cavity and extending from the receiver housing to a second side of the receiver septum, wherein the first receiver antenna and the second receiver antenna convert a received electromagnetic signal to an electrical signal.

13. The dielectric tool of claim 12, wherein:
the sensing pad on the tool body comprises a movable pad;
the at least one transmitter and at least one receiver are disposed on the movable pad; and
the movable pad is extendable to abut the transmitter and the receiver against the wellbore.

14. The dielectric tool of claim 12, further comprising a switch connected to the transmitter, wherein operation of the switch controls whether a first electromagnetic signal output from the first transmitter antenna and a second electromagnetic signal output from the second transmitter antenna are in phase or out of phase.

15. The dielectric tool of claim 12, wherein:
the first transmitter antenna extends from a third wall of the transmitter housing towards the first side of the transmitter septum;
the first transmitter antenna is coupled to the first side of the transmitter septum;
the second transmitter antenna extends from a fourth wall of the transmitter housing towards the second side of the transmitter septum;
the second transmitter antenna is coupled to the second side of the transmitter septum;
the first receiver antenna extends from a third wall of the receiver housing towards the first side of the receiver septum;
the first receiver antenna is coupled to the first side of the receiver septum;

the second receiver antenna extends from a fourth wall of the receiver housing towards the second side of the receiver septum; and
the second receiver antenna is coupled to the second side of the receiver septum.

16. A method of logging well information, comprising:
inserting a dielectric logging tool into a wellbore extending through a formation, the dielectric logging tool comprising one or more transmitters and one or more receivers;
combining at least a first electromagnetic signal and a second electromagnetic signal within the one or more transmitters to form a combined electromagnetic signal, wherein the one or more transmitters each comprise:

a transmitter housing defining a transmitter cavity, wherein the transmitter housing has a transmitter aperture at one end thereof;

a transmitter septum disposed within the transmitter cavity and extending from a first wall of the transmitter housing to a second wall of the transmitter housing along at least a portion of the transmitter cavity, wherein a height of the transmitter septum is measured from the first wall of the transmitter housing, wherein the height of the transmitter septum decreases as it extends along a length of the transmitter cavity in a direction of the transmitter aperture, and wherein the height of the transmitter septum decreases continuously along a curved path such that a leading edge of the transmitter septum is concave;

a first transmitter antenna disposed within the transmitter cavity and extending from the transmitter housing to a first side of the transmitter septum; and a second transmitter antenna disposed within the transmitter cavity and extending from the transmitter housing to a second side of the transmitter septum, wherein the first transmitter antenna and the second transmitter antenna produce the combined electromagnetic signal;

emitting the combined electromagnetic signal into the formation; and receiving the combined electromagnetic signal at the one or more receivers, wherein the one or more receivers each comprise:

a receiver housing defining a receiver cavity, wherein the receiver housing has a receiver aperture at one end thereof;

a receiver septum disposed within the receiver cavity and extending from a first wall of the receiver housing to a second wall of the receiver housing along at least a portion of the receiver cavity, wherein a height of the receiver septum is measured from the first wall of the receiver housing, wherein the height of the receiver septum decreases as it extends along a length of the receiver cavity in a direction of the receiver aperture, and wherein the height of the receiver septum decreases continuously along a curved path such that a leading edge of the receiver septum is concave;

a first receiver antenna disposed within the receiver cavity and extending from the receiver housing to a first side of the receiver septum; and a second receiver antenna disposed within the receiver cavity and extending from the receiver housing to a second side of the receiver septum, wherein the first receiver antenna and the second receiver antenna convert the received combined electromagnetic signal to an electrical signal.

17. The method of claim 16, wherein:

the combined electromagnetic signal is in a first orientation when the first electromagnetic signal and the second electromagnetic signal are in phase; and the combined electromagnetic signal is in a second orientation when the first electromagnetic signal and the second electromagnetic signal are out of phase, and the second orientation being perpendicular to the first orientation.

18. The method of claim 17, wherein the combined electromagnetic signal is in the second orientation when the first electromagnetic signal and the second electromagnetic signal are out of phase by 180 degrees.

19. The method of claim 17, wherein a switch controls whether the first and second electromagnetic signals are in phase or out of phase.

20. The method of claim 16, wherein receiving the combined electromagnetic signal at one of the one or more receivers further comprises:

dividing the combined electromagnetic signal into at least a first component and a second component via the receiver septum;

receiving the first component with the first receiver antenna to produce a first electrical signal and receiving the second component with the second receiver antenna to produce a second electrical signal; and combining the first electrical signal and the second electrical signal to create a combined electrical signal.

21. The method of claim 20, wherein:

combining the first and second electrical signals by adding the first and second electrical signals creates a combined electrical signal corresponding to an electromagnetic signal in a first orientation; and combining the first and second electrical signals by subtracting the first and second electrical signals creates a combined electrical signal corresponding to an electromagnetic signal in a second orientation.

22. The method of claim 20, further comprising analyzing characteristics of the combined signal to determine changes to the combined electromagnetic signal as it moved between the one or more transmitters and the one or more receivers.

* * * * *